(No Model.)

L. E. SECREST.
COTTON SEED PLANTER.

No. 413,105. Patented Oct. 15, 1889.

Witnesses
Geo. J. Thorpe
R. J. Marshall Jr.

Inventor
Louis E. Secrest.
By his Attorneys

UNITED STATES PATENT OFFICE.

LOUIS EVIN SECREST, OF PARIS, TEXAS.

COTTON-SEED PLANTER.

SPECIFICATION forming part of Letters Patent No. 413,105, dated October 15, 1889.

Application filed April 20, 1888. Renewed September 16, 1889. Serial No. 324,007. (No model.)

*To all whom it may concern:*

Be it known that I, LOUIS EVIN SECREST, a citizen of the United States, residing at Paris, in the county of Lamar and State of Texas, have invented new and useful Improvements in Cotton-Seed Planters, of which the following is a specification.

The invention relates to cotton-seed planters, its object being to provide a machine of cheap and durable construction by means of which the seed can be planted all the way to the fence or to the end of the row; and it consists in the construction and novel combination of parts hereinafter described, and pointed out in the appended claim.

Figure 1:
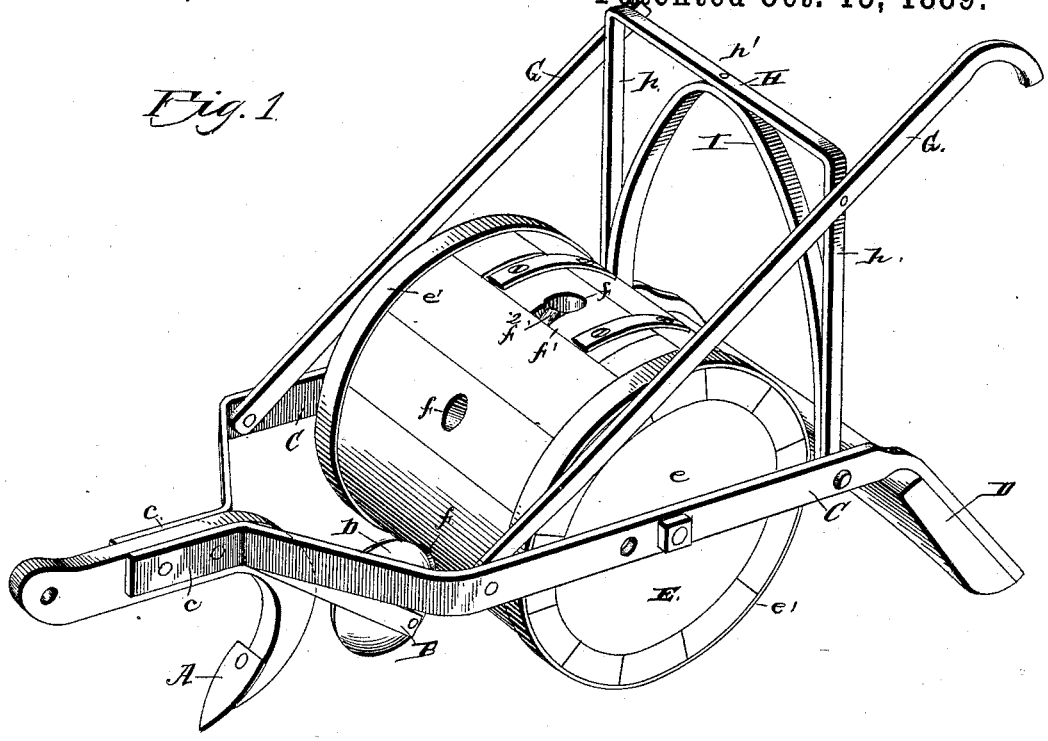
Figure 2:
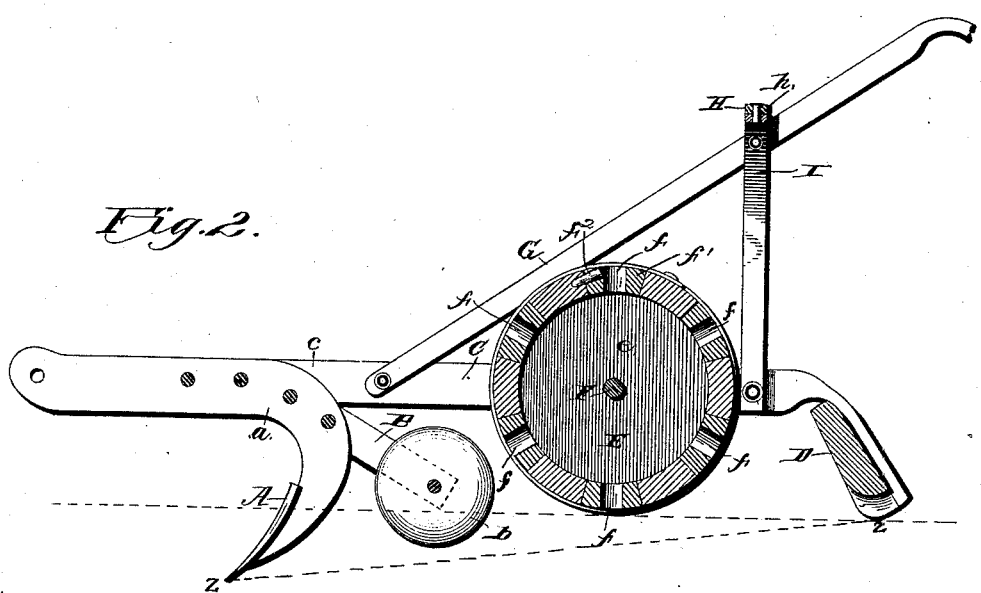

In the accompanying drawings, Figure 1 is a perspective view of a planter embodying the invention. Fig. 2 is a central vertical longitudinal section of the same.

Referring to the drawings by letter, A designates the furrow-opener or plow-point, secured to the lower end of the curved standard $a$, the upper end of which is bent to stand horizontally forward, and has a hook or clevis attached in an opening in its end.

B B are rearwardly and downwardly inclining arms, that are bolted to the top of the curve of the standard $a$ on each side, and have the furrow-wheel $b$ journaled between their ends. The said wheel is for the purpose of entering the furrow behind the opener and driving its walls apart in order to give sufficient room to plant the seed.

C C are the side bars of the main frame, which are outside of everything, so that the machine is not liable to catch on stumps or other obstructions. The said side bars are secured at their front ends $c$ $c$ by bolts to the standard $a$ in front of its curve and of the arms B. They then stand outwardly and rearwardly at equal angles till they are about twenty inches apart, when they are bent rearwardly and parallel. The rear ends of the side bars are bent downward and incline rearward, and have connected to them by bolts the detachable covering-board D, having a concave lower edge, as shown. If desired, plow-points similar to the point A may be secured to a bar connecting said ends.

E is the drum, made of the end disks $e$ and the staves connecting the said disks and bound thereon by the metal end hoops $e'$. The said end disks are provided with central openings for the passage of the shaft F, that has bearings at opposite points in the side bars of the main frame. The said drum is provided with a central circumferential series of openings $f$, which are equidistant and aligned with the furrow-opener and furrow-wheel.

$f'$ is the hinged door of the drum, which door is retained closed by a suitable pin $f^2$, as shown.

G G are the handles, secured by bolts at their front ends to the inner sides of the bars C C at the front inward bends thereof. The handles extend rearwardly and upwardly, and are secured to the upper portions of the vertical arms $h$ of the rectangularly-bent brace-bar H, the lower ends of which are secured to the inner sides of the side bars behind the drum.

I is a brace-bar bent centrally and having its bent portion secured by a bolt to the center of the transverse bar $h'$ of the brace H, while its ends are bolted, together with the ends of the brace H, to the side bars C. The furrow-wheel has convex sides to spread the furrow open to receive the planting. A line $zz$, drawn from the point of the furrow-opener to the middle of the lower edge of the covering-board, will in practice pass about one inch below the furrow-wheel and about three inches below the drum.

Having described my invention, I claim—

In a cotton-planter, the combination, with the side bars C C of the main frame, the plow-standard $a$, connecting the front ends thereof, and the covering-board D, connecting the rear ends of the side bars, of the handles secured to the side bars near the front end of the machine, the rectangularly-bent brace-bar H, secured to the side bars and to the handles, and the centrally-bent brace-bar I, secured to the side bars and the brace-bar H, substantially as specified.

In testimony that I claim the foregoing as my own I have hereto affixed my signature in presence of two witnesses.

LOUIS EVIN SECREST.

Witnesses:
 A. MICHAELS,
 GEO. A. TITTERINGTON.